United States Patent [19]

Strong

[11] Patent Number: 4,850,554
[45] Date of Patent: Jul. 25, 1989

[54] STABILIZING PARACHUTE HARNESS

[76] Inventor: Edward T. Strong, 5062 Downing St., Orlando, Fla. 32809

[21] Appl. No.: 7,139

[22] Filed: Jan. 27, 1987

[51] Int. Cl.⁴ .............................................. B64D 17/30
[52] U.S. Cl. ............................ 244/151 R; 244/151 A; 244/142
[58] Field of Search .............................. 244/151 R–152, 244/142, 143, 145, 147; 182/3, 231, 235, 5

[56] References Cited

U.S. PATENT DOCUMENTS

| | | |
|---|---|---|
| 1,369,139 | 2/1921 | Sperry . |
| 2,384,416 | 9/1945 | Derry ................................ 244/152 |
| 2,396,092 | 3/1946 | Efstathiou ......................... 244/142 |
| 2,417,168 | 3/1947 | Kalnitz . |
| 2,448,066 | 8/1948 | Wilson ........................... 244/151 R |
| 2,458,264 | 1/1949 | Hart . |
| 2,462,234 | 2/1949 | Supina . |
| 2,825,515 | 3/1958 | Gold . |
| 2,987,279 | 6/1961 | Gray . |
| 3,055,621 | 9/1962 | Martin ............................... 244/142 |
| 3,088,700 | 5/1963 | Carrey . |
| 3,149,807 | 9/1964 | Jungersen et al. . |
| 3,355,128 | 11/1967 | Mitchell . |
| 3,412,963 | 11/1968 | Struble ............................. 244/152 |
| 3,747,877 | 7/1973 | Drew . |
| 4,090,683 | 5/1978 | Derrier . |
| 4,699,338 | 10/1987 | Penberthy ......................... 244/152 |

*Primary Examiner*—Joseph F. Peters, Jr.
*Assistant Examiner*—Gregory R. Smith
*Attorney, Agent, or Firm*—Fulwider, Patton, Rieber, Lee & Utecht

[57] ABSTRACT

A parachute harness including a pair of shoulder straps having connected to the upper portion thereof at front and rear spaced apart locations a pair of riser straps which rise upwardly to connect with the canopy shroud lines. The forward and rearward riser straps of the right and left pair are releasably connected together intermediately in close spaced relationship to form at the intermediate location a fulcrum point such that during opening shock the riser straps are connected together at the fulcrum point for swaying of the jumper to and fro generally about such fulcrum point. After deployment of the canopy, the riser straps may be released at the fulcrum point to permit the intermediate portion of the riser to draw apart to assume orientations angling generally upwardly and outwardly from the respective anchor points to thus minimize oscillation of the jumper under the canopy and stabilize the jumper during his descent and while making manuevers and landing.

9 Claims, 2 Drawing Sheets

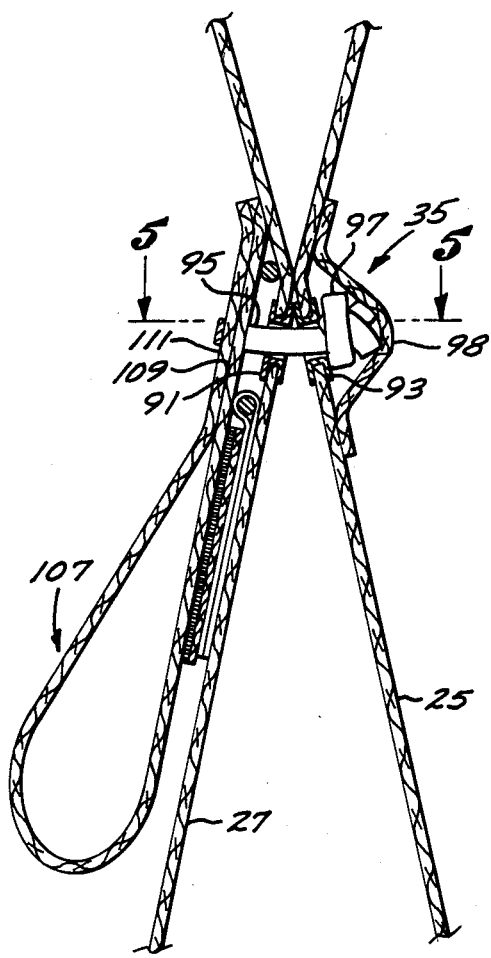
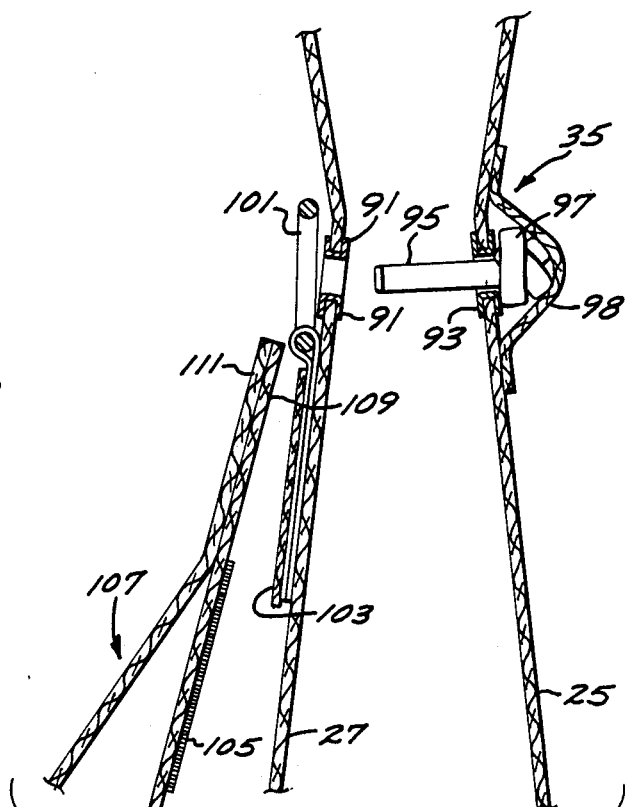
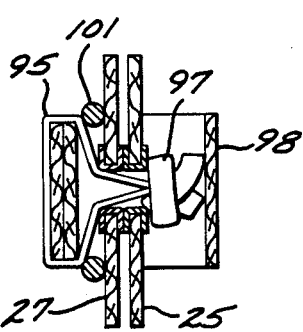
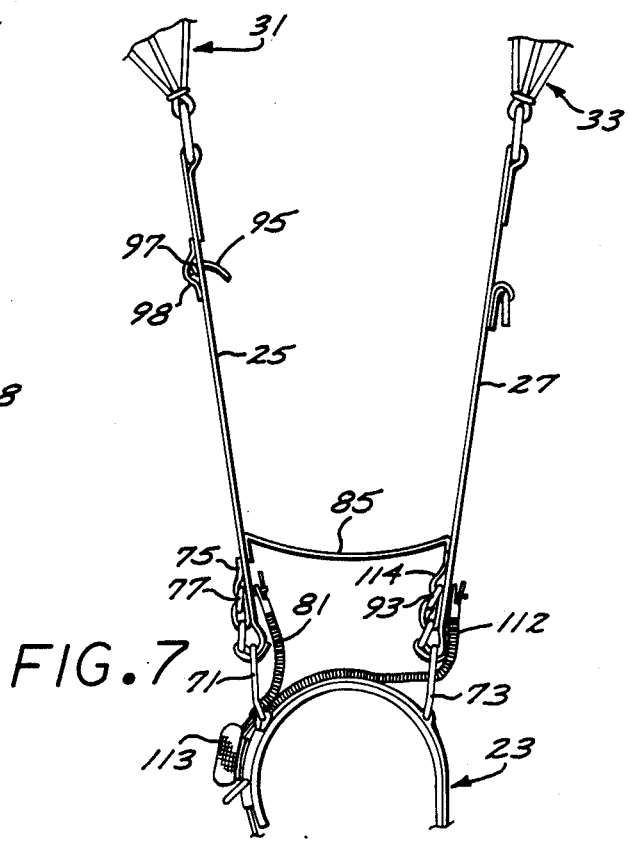
FIG. 4
FIG. 6
FIG. 5
FIG. 7

STABILIZING PARACHUTE HARNESS

BACKGROUND OF THE INVENTION

1. Field of the Invention

The stabilizing parachute harness of the present invention relates to a parachute harness typically utilized by skydivers.

2. Description of the Prior Art

With the advent and popularity of highly maneuverable parachute canopies there has been the development of high performance parachute canopies and harnesses. As the skydiver's equipment has improved, enhancing the maneuverability of the jumper, more advanced jumping techniques and maneuvers have been achieved. As greater numbers of participants become involved in jumping and jumpers become more proficient, the demand for higher performing equipment has increased.

It has been common practice in both sports parachute jumping and accuracy jumping for the parachute harness to be suspended under the canopy by a single pair of right and lefthand riser straps, connected at the shoulder straps at single anchor points. Such an attachment has proven successful because of the fact that upon initial deployment of the canopy, the harness is loaded at a single point on the right and lefthand side to thus, with proper prejump adjustment, load the harness evenly and maintain the jumper at a generally favorable orientation during deployment, descent and landing. Some of the shortcomings of such prior art parachute harnesses include the fact that suspension of the jumper from single riser straps inherently restrict the degree of adjustment which may be achieved for varying the orientation and attitude of the jumper's body relative to the canopy during descent. Moreover, the anchoring of the individual right and lefthand riser straps at respective single anchor points on the shoulder straps, creates inherent pivot points about which the jumper tends to oscillate to and fro during descent and landing.

Accordingly, there exists a demand for a parachute harness which connects to the shoulder straps in such a manner as to stabilize the jumper during descent from uncontrolled oscillating about single right and lefthand anchor points. A further need exists for such a harness which incorporates a pair of right and lefthand fulcrum points which define a single lateral axis about which the jumper may oscillate during deployment of the canopy during initial deployment such that forces will be uniformly loaded on the harness and the harness maintained in a predetermined orientation on the jumper relative to the canopy during deployment.

Other objects and features of the invention will become apparent from consideration of the following description taken in connection with the accompanying drawing.

BRIEF DESCRIPTION OF THE DRAWINGS

FIG. 4 is a vertical sectional view, in enlarged scale, taken along the line 4—4 of FIG. 1;

FIG. 5 is a horizontal sectional view taken along the line 5—5 of FIG. 4;

FIG. 6 is a vertical sectional view similar to FIG. 4 but showing the risers uncoupled from one another; and FIG. 7 is a partial righthand side view similar to FIG. 2.

DESCRIPTION OF THE PREFERRED EMBODIMENT

Figure 2:
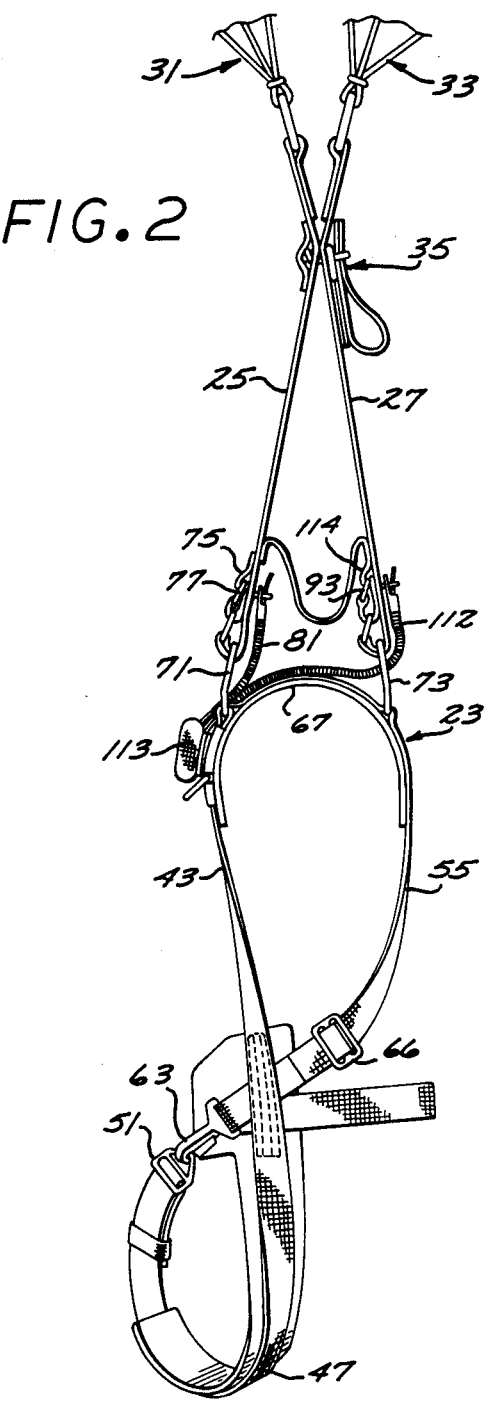
FIG. 2 is a righthand side view of the stabilizing parachute harness apparatus shown in FIG. 1.

Referring to FIGS. 2, 4 and 7, the stabilizing parachute harness apparatus of the present invention includes, generally, right and lefthand shoulder straps 21 and 23, each having anchored to the top thereof, at forward and rearward spaced locations, a pair of forward and rearward riser straps 25 and 27, respectively. The riser straps 25 and 27 are connected on their top ends to the respective four quadrants of parachute shroud lines depending from a parachute canopy, a bottom of the forward and rearward lefthand quadrants 31 and 33 being shown in FIG. 2. The riser straps 25 and 27 are releasably connected together in their intermediate portion by means of a releasable coupler, generally designated 35.

Figure 1:
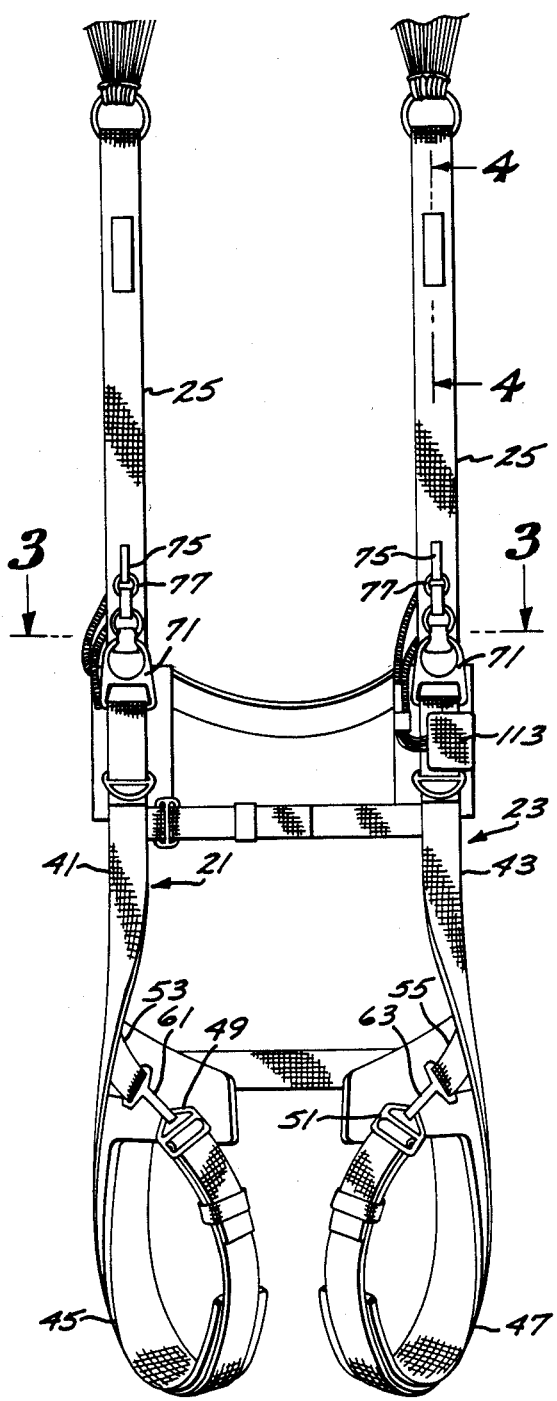
FIG. 1 is a front view of a stabilizing parachute harness apparatus embodying the present invention.
Figure 3:
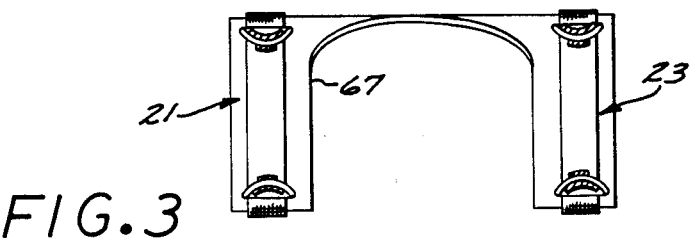
FIG. 3 is a horizontal sectional view taken along the line 3—3 of FIG. 1.

Referring to FIGS. 1, 2 and 3, the shoulder straps 21 and 23 pass over the tops of the shoulders, downwardly over the opposite sides of the chest to form respective chest straps 41 and 43 then pass outside the thighs and behind the jumper's buttocks to pass under the jumper's upper leg to form respective leg straps 45 and 47 which loop upwardly on the inside of the jumper's thighs to mount respective buckles 49 and 51. Referring to FIG. 2, the backside of the respective shoulder straps 21 and 23 pass downwardly on the backside of the jumper's shoulders to form respective back straps 53 and 55 which have connected to the free ends thereof respective snaps 61 and 63 which snap to the respective buckles 49 and 51. Each of the back straps 5 and 55 incorporate length adjustment buckles 66 (FIG. 2) such that the lengths thereof may be adjusted to adjust the attitude of the jumper in the harness as described hereinafter.

With continued reference to FIG. 2, mounted under the top of the shoulder straps 21 and 23 are respective pads 67. The bottom ends of the riser straps 25 and 27 are connected at forwardly and rearwardly spaced locations, respectively, on the shoulder straps 21 and 23, the lefthand risers 25 and 27 being depicted in FIG. 2 as being attached to the lefthand shoulder strap 23 by means of ring fittings 71 and 73. The connection between the risers 25 and 27 and the ring fittings 71 and 73 is made by means of a toggle strap 75 secured on its top end to the forward strap 25 and passing through a locking ring 77 to pass through a grommet (not shown) in the body of the strap 25 and is formed on its free extremity with a grommet through which the holding end of a rip cord 81 projects. Similarly, the connection of the bottom end of the rear riser strap 27 is made through the ring fitting 73 by means of a toggle strap 114 which passes through a ring 93, through a grommet in the body of the strap 27 to have a grommet mounted in the free end thereof to be engaged by the holding end of a second rip cord 112. The rip cords 81 and 112 connect with a handle 113 mounted on the front of the lefthand shoulder strap 23 for convenient grasping by the jumper in flight such that the riser straps 25 and 27 may be released from the shoulder strap for disengagement of the main canopy in the event of entanglement or the like.

Referring to FIGS. 2 and 7, the lower extremities of the riser straps 25 and 27 are connected together in spaced apart relationship by means of a connector strap 85 which serves the purpose of tethering the free ends of such riser straps together when uncoupled from the shoulder straps 21 and 23 and serves the additional function of acting as a safety strap which will serve to transfer the load from one strap 25 to the other 27 in the event one or the other of such straps should break or fail during descent.

Referring to FIGS. 4 and 6, the coupler 35 serves to maintain the intermediate portions of the riser straps 25 and 27 maintained coupled together in close spaced relationship such that, when viewed from the side under load, such straps cooperate to form an X-pattern. The riser straps 25 and 27 have mounted intermediate therein respective grommets 91 and 93 which receive therethrough a coupler loop 95 (FIG. 5). The coupler loop is formed by a length of strap doubled back on itself and formed on the backside of the strap 27 with a knot 97 which stops the coupler loop 95 from feeding forwardly through such grommets. The coupler loop 95 is held releasably in position by means of a backing strap 98 which passes in confronting relationship with the grommet 93 and is secured on its opposite ends to the strap 27 to thus hold the knot 97 in place as shown in FIG. 5.

With continued reference to FIGS. 4 and 6, mounted on the front side of the forward strap 25, in confronting relationship with the grommet 91, is a stop ring 101. Mounted beneath the stop ring 101 is a VELCRO fastener strip 103 which mates with a VELCRO strip 105 mounted on the underside of a release strap, generally 107. The release strap 107 is looped back on itself to form a closed loop terminating at its opposite ends in overlying fastener tabs 109 and 111 secured together for fitting through the toggle coupler loop 95 as shown in FIGS. 4 and 5.

In operation, when the parachutist dons the stabilizing harness, he or she will adjust the length of the respective shoulder straps 21 and 23 via the buckle 66 to accommodate the physical size of the parachutist and to dispose the anchor rings 73 and 75 at the desired location relative to the center of gravity of the jumper to thereby maintain the attitude of the jumper during descent and landing as will be described hereinafter. When the jumper leaves the aircraft and deploys the canopy, it will be appreciated that as the canopy shroud lines are loaded through the risers 25 and 27, the initial shock will be carried through the leg straps 45 and 47 to the shoulder straps 21 and 23. It is important that during the initial opening shock that the coupling 35 maintains the risers connected together in close spaced relationship to thus define a transverse fulcrum axis concentrating the forces. This serves to assure relatively even loading of the canopy and also relatively even loading of the harness itself to thus avoid one or the other of the anchor hook fittings 71 or 73 becoming unevenly loaded to thus jerk the harness askew on the body of the jumper during opening shock.

Once the opening shock has been absorbed and the harness evenly loaded, the jumper may reach up behind the rear riser straps 27 to grasp the release strap 107 and draw outwardly thereon to disengage the VELCRO fastener strip 105 from the VELCRO fastener strip 103 (FIG. 6) and draw the release strap bodily downwardly to disengage the overlying tabs 109 and 111 from the coupler loop 95. This frees the coupler loop to then pass through the fastener ring 101 and grommet 91 to thus free the riser straps 25 and 27 to assume the generally divergent orientation shown in FIG. 6 thus loading the anchor ring fitting 71 and 73 relatively evenly from the respective quadrants of the canopy. Suspension of the jumper via the risers 25 and 27 from the ring fittings 71 and 73 disposed forwardly and rearwardly, respectively, of a vertical plane passing through the center of gravity of the jumper serves to stabilize the jumper against oscillation under the canopy. This removes the distraction of oscillation and permits the jumper to concentrate on steering the parachute as he approaches the ground and to concentrate on his landing point. This can be particularly important in military jumps or in competition where the precise point of landing is of ultimate importance requiring the jumper to maintain a good uninterrupted view of the landing target.

As mentioned hereinabove, it is also important that, with the forward and rearward anchor points defined by the rings 71 and 73 on the forward and rearward sides of a vertical plane through the center of gravity, the length of the back strap 55 may be pre-adjusted by the buckle 66 prior to the jump to thus maintain the jumper's body in the desired attitude, either fully vertical or pitched slightly forward, rather than in the recline position typically associated with conventional parachute harnesses. It will also be appreciated that with the subject harness, the balance point for the body's jumper is lower thus enabling the riser straps 25 and 27 themselves to be shorter thus disposing the jumper closer to the canopy than would be the case for conventional harnesses.

Various modifications and changes may be made with regard to the foregoing detailed description without departing from the spirit of the invention.

I claim:

1. Stabilizing parachute harness apparatus for suspending a jumper from four respective quadrant rings coupled to the bottom end of four respective quadrants of shroud lines depending from a canopy and comprising:

harness means including a pair of right and left shoulder straps for supporting said jumper under said quadrant rings;

a pair of forward and a pair of rearward riser straps affixed on their bottom extremities at forward and rearward spaced apart anchor points on said respective right and left shoulder straps and projecting upwardly therefrom to connect with said shroud lines, said pairs of riser straps having a deployment mode, converging upwardly and inwardly from said respective pairs of forward and rearward anchor points to converge in close spaced relationship to define respective fulcrum points and then diverging upwardly and outwardly to said respective quadrant rings, said risers further having a descent and landing mode diverging directly upwardly and outwardly from said anchor points to said respective quadrant rings;

connector means for releasably connecting the intermediate portions of said riser straps together in said close spaced relationship to define said deployment mode; and release means connected with said connector means operable to release said connector means, whereby when said jumper deploys said canopy, the forces applied to said shoulder straps will be initially directed up said risers through said fulcrum points to said quadrants of shroud lines and said release means may then be operated to release said connector means to free said intermediate portions of said riser straps to enable said respective riser straps to assume said descent and landing mode to transfer the weight of said jumper divergently upwardly and outwardly from said respective anchor points to said respective quadrant rings.

2. Stabilizing parachute harness apparatus as set forth in claim 1 wherein:
   said harness includes respective back straps and chest straps connected at the respective opposite ends of said respective shoulder straps, and adjustment buckle means for adjusting the respective lengths of said back straps relative to said respective chest straps to thus shift the forward and rearward positions of said respective forward and rearward anchor points with respect to the body of said jumper.

3. Stabilizing parachute harness apparatus as set forth in claim 1 that includes:
   a pair of tether straps extending from said respective forward to said respective rearward riser straps at a point on said respective riser straps at a point on said respective riser straps between said connecting means and said anchor points, said tether straps being fastened on their respective forward ends to said respective forward riser straps and on their respective rearward ends to the respective rearward riser straps.

4. Stabilizing parachute harness apparatus as set forth in claim 1 wherein:
   said respective riser straps include respective grommets disposed adjacent said respective fulcrum points;
   said connecting means includes respective coupling straps projecting from said respective forward riser straps and through said respective grommets to form toggle loops on the back sides of said respective rearward riser straps; and
   said release means includes respective toggles formed on one end with stop tabs releasably inserted through said respective toggle loops and formed on their respective opposite ends with hand hold means to be grasped by said jumper to withdraw said respective stop tabs from said respective toggle loops.

5. Stabilizing parachute harness apparatus as set forth in claim 4 wherein:
   said connecting means includes respective eyelet rings on the back sides of said respective rearward risers straps, disposed in confronting relation over the back sides of the aforementioned respective grommets, with said coupling straps projecting therethrough and, anchor straps fastening the respective eyelet rings to said rearward riser straps.

6. Stabilizing parachute apparatus as set forth in claim 4 that includes:
   fastener grommets mounted in said forward risers in confronting relationship with said first mentioned grommets and sized from passage of said coupling straps and wherein said coupling straps are formed with respective fastener knots disposed on the front sides of said respective fastener grommets.

7. Stabilizing parachute harness apparatus as set forth in claim 2 that includes:
   a pair of tether straps interposed between said respective forward and rearward riser straps and being fastened on their respective forward ends to said respective forward riser straps and on their respective rearward ends to the respective rearward riser straps.

8. Stabilizing parachute harness apparatus as set forth in claim 2 wherein:
   said respective rearward riser straps include respective grommets disposed adjacent said respective fulcrum points;
   said connecting means includes respective coupling straps projecting from said respective forward riser straps and through said respective grommets to form toggle loops on the back sides of said respective back riser straps, attachment means attaching said respective toggle loops to said respective back riser straps; and
   said release means includes respective toggles formed on one end with stop tabs releasably inserted through said respective toggles with said stop tabs formed on their respective opposite ends with hand hold means to be grasped by said jumper to withdraw said respective stop tabs from said respective toggle loops.

9. Stabilizing parachute harness apparatus as set forth in claim 1 including:
   attachment means for releasably attaching said riser straps to said anchor points; and
   a second release means to release said attachment means.

* * * * *